US011511816B1

(12) United States Patent
Vanduzer

(10) Patent No.: US 11,511,816 B1
(45) Date of Patent: Nov. 29, 2022

(54) TAILGATE DEVICE WITH FOLDING FEATURE AND RELATED METHODS

(71) Applicant: Shirley A. Vanduzer, Neptune Beach, FL (US)

(72) Inventor: Shirley A. Vanduzer, Neptune Beach, FL (US)

(*) Notice: Subject to any disclaimer, the term of this patent is extended or adjusted under 35 U.S.C. 154(b) by 0 days.

(21) Appl. No.: 17/820,592

(22) Filed: Aug. 18, 2022

Related U.S. Application Data

(60) Provisional application No. 63/304,737, filed on Jan. 31, 2022.

(51) Int. Cl.
*B62D 33/037* (2006.01)
*B62D 33/033* (2006.01)

(52) U.S. Cl.
CPC ......... *B62D 33/037* (2013.01); *B62D 33/033* (2013.01)

(58) Field of Classification Search
CPC B62D 33/023; B62D 33/027; B62D 33/0273; B62D 33/0276; B62D 33/033; B62D 33/037; B60J 5/06; B60J 5/10; B60J 5/105; B60J 5/12; B60J 7/108
USPC ............................................ 296/51–55, 57.1
See application file for complete search history.

(56) References Cited

U.S. PATENT DOCUMENTS

| | | | | |
|---|---|---|---|---|
| 4,778,213 A * | 10/1988 | Palmer | ................... | B62D 33/08 296/26.11 |
| 4,861,093 A * | 8/1989 | Chapman | ............ | B62D 33/0273 296/180.1 |
| 5,664,822 A | 9/1997 | Rosenfield | | |
| 5,685,594 A | 11/1997 | Harper | | |
| 5,711,569 A | 1/1998 | Sovoda | | |
| 5,755,480 A * | 5/1998 | Bryan | ....................... | B60P 3/40 224/403 |
| 5,876,086 A | 3/1999 | Lagrou et al. | | |
| 5,997,066 A * | 12/1999 | Scott | .................. | B62D 33/0273 296/57.1 |
| 6,435,596 B1 | 8/2002 | Pyo | | |
| 6,764,123 B1 | 7/2004 | Bilyard | | |
| 7,111,886 B1 * | 9/2006 | Miller | ................... | B60P 7/0892 296/26.11 |
| 7,488,021 B1 | 2/2009 | Roos et al. | | |
| 7,644,973 B2 | 1/2010 | Carloni et al. | | |
| 8,740,279 B1 * | 6/2014 | McGoff | ............. | B62D 33/0273 49/168 |
| 10,293,868 B2 | 5/2019 | Jergess et al. | | |
| 10,920,472 B2 | 2/2021 | Trentin et al. | | |
| 11,214,318 B1 * | 1/2022 | Parker | ........................ | B60J 5/12 |

(Continued)

*Primary Examiner* — Gregory A Blankenship
(74) *Attorney, Agent, or Firm* — Allen, Dyer, Doppelt + Gilchrist, PA

(57) ABSTRACT

A tailgate device includes a first panel defining first openings, and a second panel defining second openings. The tailgate device also includes a hinge coupled between first ends of the first and second panels and permitting the first and second panels to switch between an extended state and a folded state, and a sleeve receiving uppermost portions of the first ends of the first and second panels and aligned with the hinge to lock the first and second panels in the extended state. The tailgate device also includes a first retention device coupled to a second end of the first panel and to be coupled to a first side portion of a truck bed of a vehicle, and a second retention device coupled to a second end of the second panel and to be coupled to a second side portion of the truck bed of the vehicle.

20 Claims, 7 Drawing Sheets

(56) References Cited

U.S. PATENT DOCUMENTS

| | | | |
|---|---|---|---|
| 2003/0110705 A1* | 6/2003 | Hlavach | B60J 5/103 |
| | | | 49/501 |
| 2005/0093339 A1 | 5/2005 | Klassen | |
| 2006/0214449 A1* | 9/2006 | Klusmeier | B62D 33/0273 |
| | | | 296/26.11 |
| 2010/0078955 A1 | 4/2010 | Smith | |
| 2011/0148145 A1* | 6/2011 | Nishiike | B62D 33/0273 |
| | | | 296/182.1 |
| 2017/0313365 A1* | 11/2017 | Camp | B62D 33/037 |
| 2018/0086392 A1* | 3/2018 | Seki | B62D 33/0273 |
| 2020/0047821 A1* | 2/2020 | Santana | E05F 15/614 |
| 2021/0300482 A1* | 9/2021 | Mooney | B62D 33/037 |

* cited by examiner

TAILGATE DEVICE WITH FOLDING FEATURE AND RELATED METHODS

RELATED APPLICATION

This application is based upon prior filed copending Application No. 63/304,737 filed Jan. 31, 2022, the entire subject matter of which is incorporated herein by reference in its entirety.

TECHNICAL FIELD

The present disclosure relates to the field of vehicle accessories, and, more particularly, to a tailgate device and related methods.

BACKGROUND

Trucks are the most popular vehicle type sold in the United States. Because of the popularity of trucks, the truck accessory industry is quite mature and varied. One functional aspect of trucks that receives enhanced attention is the truck bed. Given the flexible nature of the truck bed, many accessories are available.

For example, the truck bed camper is a well-known accessory. The truck bed camper is intended to fit into the truck bed for transit to a remote campsite. Typically, the truck bed camper may require the removal of the tailgate, which is left behind. Once at the campsite, the user may remove the truck bed camper. Of course, the truck bed can now be used, but without the tailgate, the truck bed has limited functionality.

SUMMARY

Generally, a tailgate device is for a vehicle. The tailgate device comprises a first panel defining a plurality of first openings therein and having first and second ends, and a second panel defining a plurality of second openings therein and having first and second ends. The tailgate device also includes a hinge coupled between the first ends of the first and second panels and permitting the first and second panels to switch between an extended state and a folded state, and a sleeve receiving uppermost portions of the first ends of the first and second panels and aligned with the hinge to lock the first and second panels in the extended state. The tailgate device also includes a first retention device coupled to the second end of the first panel and to be coupled to a first side portion of a truck bed of the vehicle, and a second retention device coupled to the second end of the second panel and to be coupled to a second side portion of the truck bed of the vehicle. In particular, the sleeve may comprise first and second arms extending vertically to abut the first ends of the first and second panels, and a medial portion between the first and second arms and on the uppermost portions of the first ends of the first and second panels.

In some embodiments, each of the first and second retention devices may comprise a plurality of dowels to be received by the first and second side portions of the truck bed of the vehicle. Each dowel may comprise an elongate member configured to extend outward and away from the second ends of the first and second panels and retract inward, and an elastic member coupled to the elongate member and to bias the elongate member to extend outward.

In other embodiments, each of the first and second retention devices may comprise a magnetic device configured to magnetically couple to the first and second side portions of the truck bed of the vehicle. In yet other embodiments, each of the first and second retention devices may comprise a retention arm extending vertically, and a slot coupled to the first and second side portions of the truck bed of the vehicle, the retention arm to be slidingly engaged with the slot when in the extended state.

Also, each of the plurality of first openings may comprise a longitudinal slot, and each of the plurality of second openings may comprise a longitudinal slot. Each longitudinal slot may comprise parallel first and second sides, and curved first and second ends between the first and second sides. For example, each of the first and second panels may comprise a polymer plastic material.

Another aspect is directed to a method for making a tailgate device for a vehicle. The method comprises forming a first panel defining a plurality of first openings therein and having first and second ends, and forming a second panel defining a plurality of second openings therein and having first and second ends. The method further includes coupling a hinge between the first ends of the first and second panels and permitting the first and second panels to switch between an extended state and a folded state, and providing a sleeve to receive uppermost portions of the first ends of the first and second panels and to be aligned with the hinge to lock the first and second panels in the extended state. The method includes coupling a first retention device to the second end of the first panel and to be coupled to a first side portion of a truck bed of the vehicle, and coupling a second retention device to the second end of the second panel and to be coupled to a second side portion of the truck bed of the vehicle.

DETAILED DESCRIPTION

Figure 1:
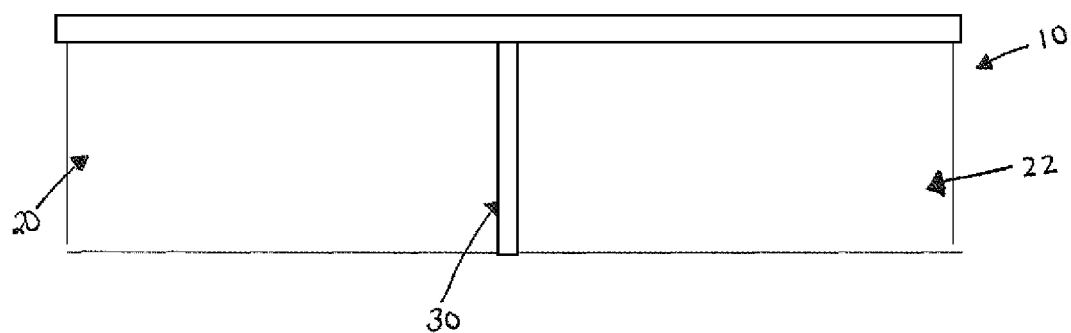
FIG. 1 is a schematic front side view of a tailgate device in the extended state without the vehicle, according to a first embodiment of the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Generally, a tailgate is disclosed that can be folded for storage and is sized to fit in a truck bed in place of an original tailgate when in use. The folding tailgate may be stored in the truck bed (e.g. below the truck's rear window) when the truck bed camper is loaded thereon. When the truck bed camper is unloaded and set-up, such as at a campsite, the folded tailgate can then be unfolded and positioned in the rear portion of the truck bed.

The tailgate according to the present invention easily stores in the truck bed with camper loaded and allows for light hauling during travels when the camper is off the truck bed. The tailgate has quick and easy installation and removal. Furthermore, the tailgate may require no tools for installation and gives the truck an appearance of completeness.

Figure 2:
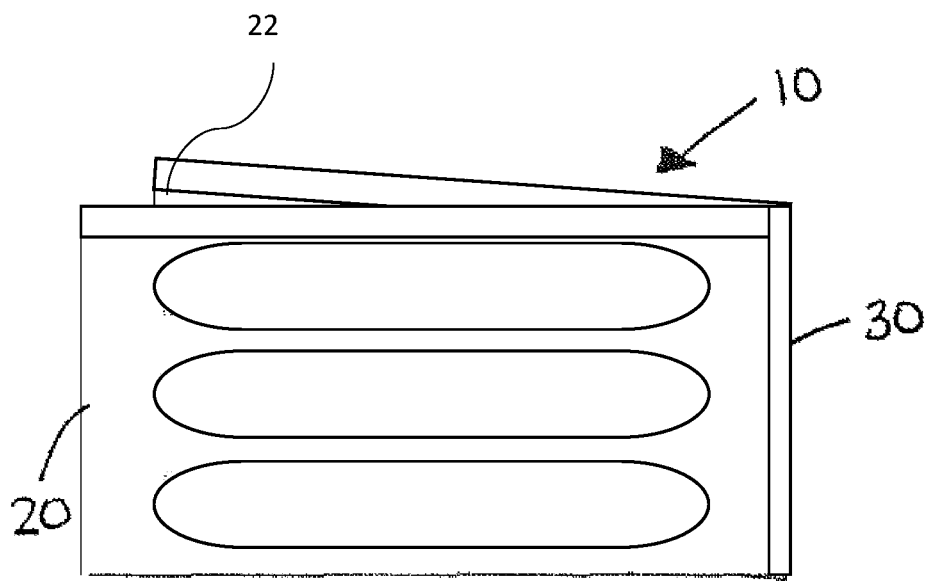
FIG. 2 is a schematic perspective view of the tailgate device of FIG. 1 in the folded state without the vehicle.
Figure 3:
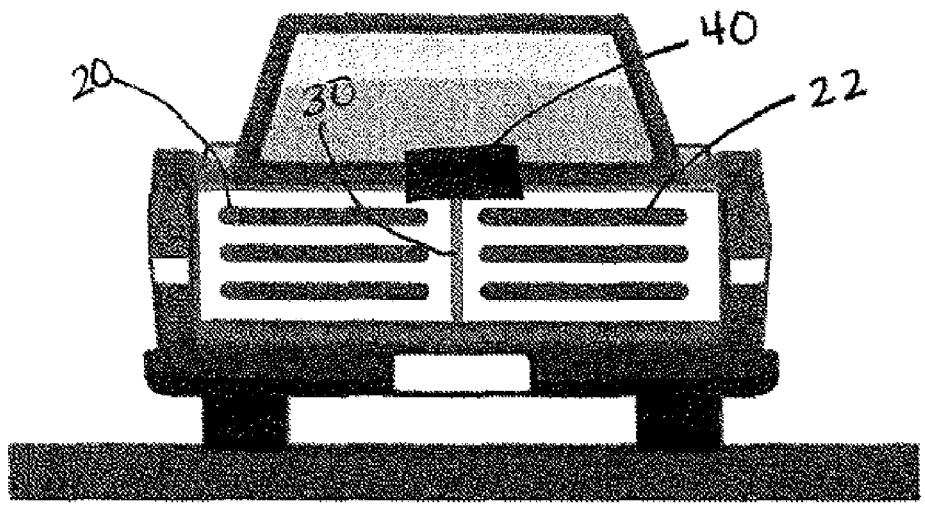
FIG. 3 is a schematic front side view of the tailgate device of FIG. 1 in the extended state with the vehicle.

Referring initially to FIGS. 1-3, a foldable tailgate 10 according to the present disclosure is described. The foldable tailgate 10 illustratively comprises two portions 20 and 22, connected together by a hinge 30 so the tailgate can be folded as shown in FIG. 2 or unfolded in a deployed configuration as shown in FIGS. 1 & 3. A brace 40 can be included at the hinge to prevent the tailgate from folding when necessary. Dowels can be located at the four corners of the tailgate to be accommodated in appropriate holes defined in the truck bed to secure the tailgate in position.

In one form of the tailgate, the tailgate panels are made of a strong, durable, lightweight, and waterproof substance. For example, a lightweight polymer is one possibility. Another embodiment of the tailgate can include a cargo net attached to the backside of each panel which will prevent smaller items falling out of the vents. Yet another form of the tailgate has the dowels being easy-release, spring-loaded stainless steel. Still, a further embodiment has the plywood brace replaced with the same material as the tailgate panels with a locking mechanism to prevent theft. The thickness of the folded tailgate should be less than the depth of the front bumpers on a truck bed camper, and the space between floor of truck bed and the bottom dowels of the tailgate should be at least 0.5 inches to accommodate different styles/thickness of rubber bed liners.

Figure 4:
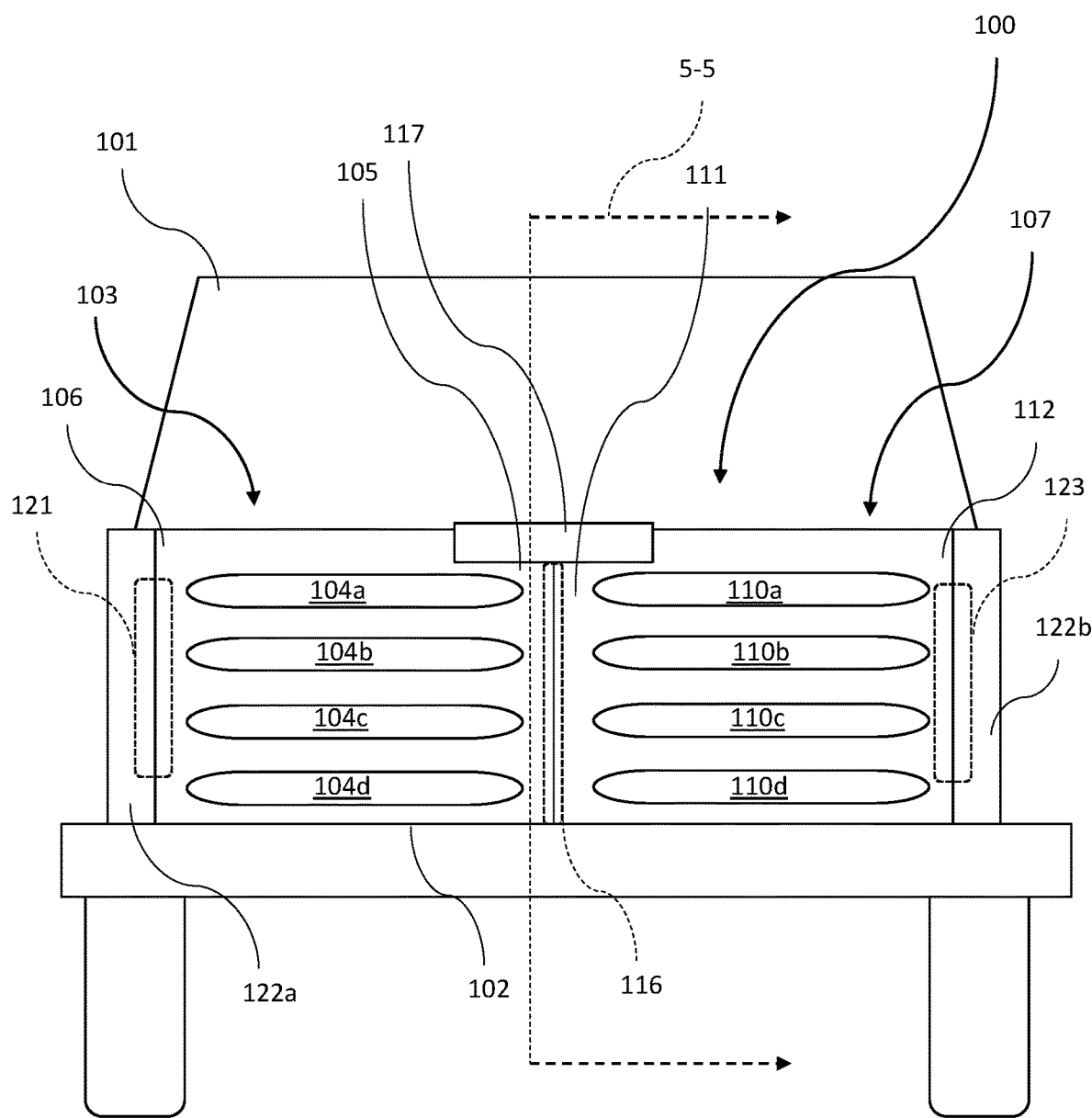
FIG. 4 is a schematic front side view of a tailgate device in the extended state with the vehicle, according to a second embodiment of the present disclosure.
Figure 5:
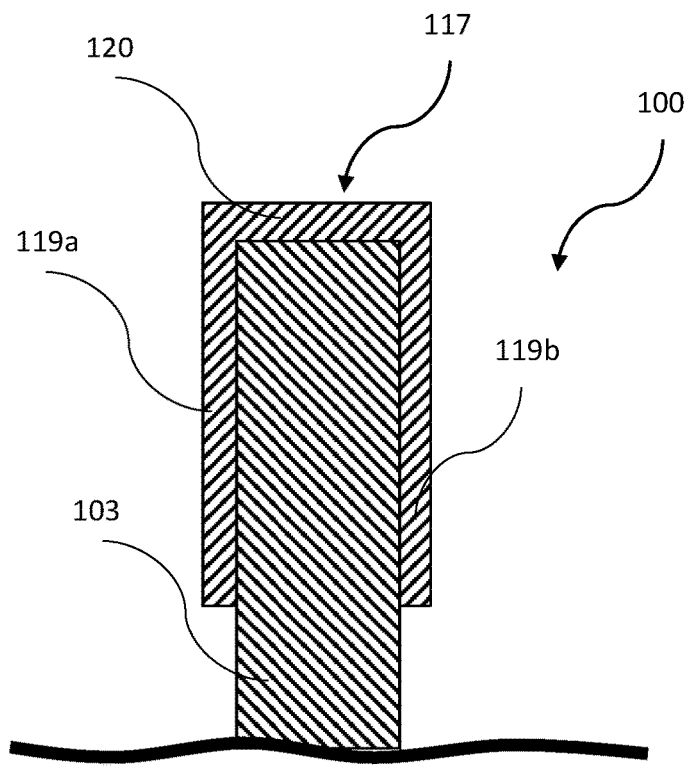
FIG. 5 is a schematic cross-sectional view of the tailgate device of FIG. 4 along line 5-5.
Figure 6:
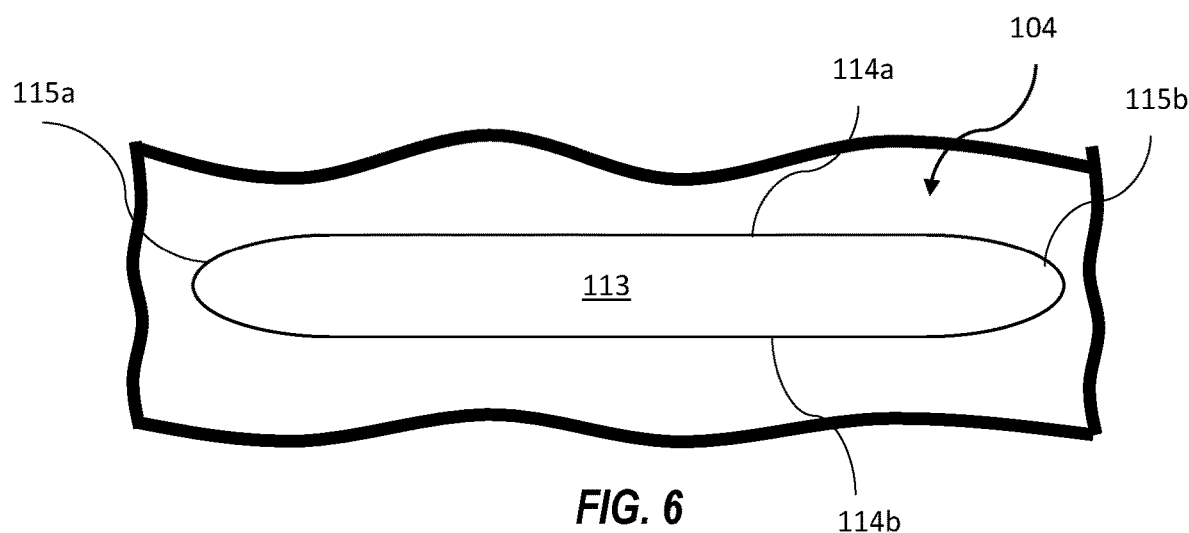
FIG. 6 is a schematic top plan view of the first and second openings in the tailgate device of FIG. 4.

Referring now to FIGS. 4-6, a tailgate device 100 according to the present disclosure is now described. The tailgate device 100 is for a vehicle 101. In particular, the tailgate device 100 is intended for a truck bed 102 of a pick-up truck style vehicle, for example, the illustrated embodiment. The tailgate device 100 may provide an approach to the above noted problems of existing tailgate devices. Helpfully, the tailgate device 100 may be quickly and readily installed into the truck bed 102 when the original tailgate has been removed for some applications, such as when hauling a truck bed camper.

The tailgate device 100 illustratively comprises a first panel 103 defining a plurality of first openings 104a-104d therein and having a first end 105 and a second end 106 opposite the first end. The tailgate device 100 illustratively comprises a second panel 107 defining a plurality of second openings 110a-110d therein. The second panel 107 also illustratively includes a first end 111 and a second end 112 opposite the first end. In the illustrated embodiment, each of the first and second panels 103, 107 is rectangle-shaped.

Also, each of the plurality of first openings 104a-104d illustratively comprises a longitudinal slot 113, and each of the plurality of second openings 110a-110d also illustratively includes a longitudinal slot 113. In other embodiments, the plurality of first openings 104a-104d and the plurality of second openings 110a-110d may comprise different shapes, such as, for example, a rectangle-shaped slot. In yet other embodiments, the plurality of first openings 104a-104d and the plurality of second openings 110a-110d may comprise a two-dimensional array/grid of circle-shaped openings.

As perhaps best seen in FIG. 6, each longitudinal slot 113 illustratively includes parallel first and second sides 114a-114b, and curved first and second ends 115a-115b between the first and second sides. In some embodiments, the first and second sides 114a-114b may be substantially parallel (i.e. ±10° of parallel) to one another. In some embodiments, the tailgate device 100 comprises first and second mesh nets respectively coupled to the inner faces of the first and second panels 103, 107 to prevent cargo from escaping the truck bed 102 through the plurality of first openings 104a-104d and the plurality of second openings 110a-110d.

For example, in some embodiments, each of the first and second panels 103, 107 may comprise a polymer plastic material. In other embodiments, each of the first and second panels 103, 107 may comprise a metallic material. Indeed, any material with sufficient rigidity may be used for the first and second panels 103, 107.

The tailgate device 100 illustratively comprises a hinge 116 coupled between the first ends 105, 111 of the first and second panels 103, 107 and permitting the first and second panels/hinge to switch between an extended state (FIGS. 1 & 3-4) and a folded state (FIG. 2). The hinge 116 may comprise a biased hinge (e.g. spring loaded hinge) configured to bias the first and second panels 103, 107 in the extended state. The tailgate device 100 is installed in the truck bed 102 in the extended state, and is stored in the folded state.

The tailgate device 100 illustratively comprises a sleeve 117 receiving uppermost portions of the first ends 105, 111 of the first and second panels 103, 107 and aligned vertically with and over the hinge 116 to lock the hinge and the first and second panels in the extended state. In particular, as perhaps best seen in FIG. 5, the sleeve 117 illustratively includes first and second arms 119a-119b extending vertically to directly abut the uppermost portions of the first ends 105, 111 of the first and second panels 103, 107, and a medial portion 120 between the first and second arms and directly sitting on the uppermost portions of the first ends of the first and second panels. As will be appreciated, the sleeve 117 prevents the hinge 116 from switching out of the extended state. The sleeve 117 may comprise a rigid material, such as a metallic compound or a polymer plastic. Advantageously, the sleeve 117 may prevent unintended collapse of the tailgate device 100 during use.

Although not shown, the sleeve 117 may comprise a retention feature for keeping the sleeve in place and keeping the tailgate device 100 in the extended state. In some embodiments, the inner surfaces of the sleeve 117 may comprise an over layer for providing non-slip surfaces. The over layer may comprise a rubber based material, or any tacky surface material. In other embodiments, the sleeve has a plurality of sleeve passageways for respectively receiving retention pins. The first ends 105, 111 of the first and second panels 103, 107 at their uppermost portions would have companion panel passageways aligned with the plurality of sleeve passageways in the sleeve 117, and the retention pins would extend through the aligned sleeve and panel passageways in both the sleeve and the first and second panels 103, 107.

In yet other embodiments, the retention feature may comprise a hook and loop interface, or an interlocking feature. For example, the sleeve 117 may comprise protrusions to be received by detents within the uppermost portions of the first and second panels 103, 107. In yet other embodiments, distal ends of the first and second arms 119a-119b of the sleeve 117 may latch into an uppermost first and second opening in the first and second panels 103, 107 with a cable. Further, the sleeve 117 may comprise a locking mechanism configured to lock the sleeve onto the first ends 105, 111 of the first and second panels 103, 107, thereby helpfully preventing unauthorized removal of the tailgate device 100.

The tailgate device 100 illustratively includes a first retention device 121 permanently coupled to the second end 106 of the first panel 103 and to be removably coupled to a first side portion 122a of the truck bed 102 of the vehicle 101. The tailgate device 100 illustratively includes a second retention device 123 permanently coupled to the second end 112 of the second panel 107 and to be removably coupled to a second side portion 122b of the truck bed 102 of the vehicle 101.

In other embodiments, each of the first and second retention devices 121, 123 may comprise a magnetic device configured to magnetically couple to the metallic portions of the first and second side portions 122a-122b of the truck bed 102 of the vehicle 101. In some embodiments, the magnetic devices may be integrally molded with the second ends 106, 112 of the first and second panels 103, 107. The first and second retention devices 121, 123 securely couple the tailgate device 100 to the first and second side portions 122a-122b of the truck bed 102 while in use in the extended state.

Another aspect is directed to a method for making a tailgate device 100 for a vehicle 101. The method comprises forming a first panel 103 defining a plurality of first openings 104a-104d therein and having first and second ends 105, 106, and forming a second panel 107 defining a plurality of second openings 110a-110d therein and having first and second ends 111, 112. The method further includes coupling a hinge 116 between the first ends 105, 111 of the first and second panels 103, 107 and permitting the first and second panels to switch between an extended state and a folded state, and providing a sleeve 117 to receive uppermost portions of the first ends 105, 111 of the first and second panels 103, 107 and to be aligned with the hinge 116 to lock the first and second panels in the extended state. The method includes coupling a first retention device 121 to the second end 106 of the first panel 103 and to be coupled to a first side portion 122a of a truck bed 102 of the vehicle 101, and coupling a second retention device 123 to the second end 112 of the second panel 107 and to be coupled to a second side portion 122b of the truck bed of the vehicle.

Advantageously, the tailgate device is securely coupled to the first and second side portions 122a-122b of the truck bed 102 of the vehicle 101. While in use, the user may use the truck bed 102 for light utility hauling, providing more flexibility for applications that demand removal of the original tailgate.

Figure 7A:
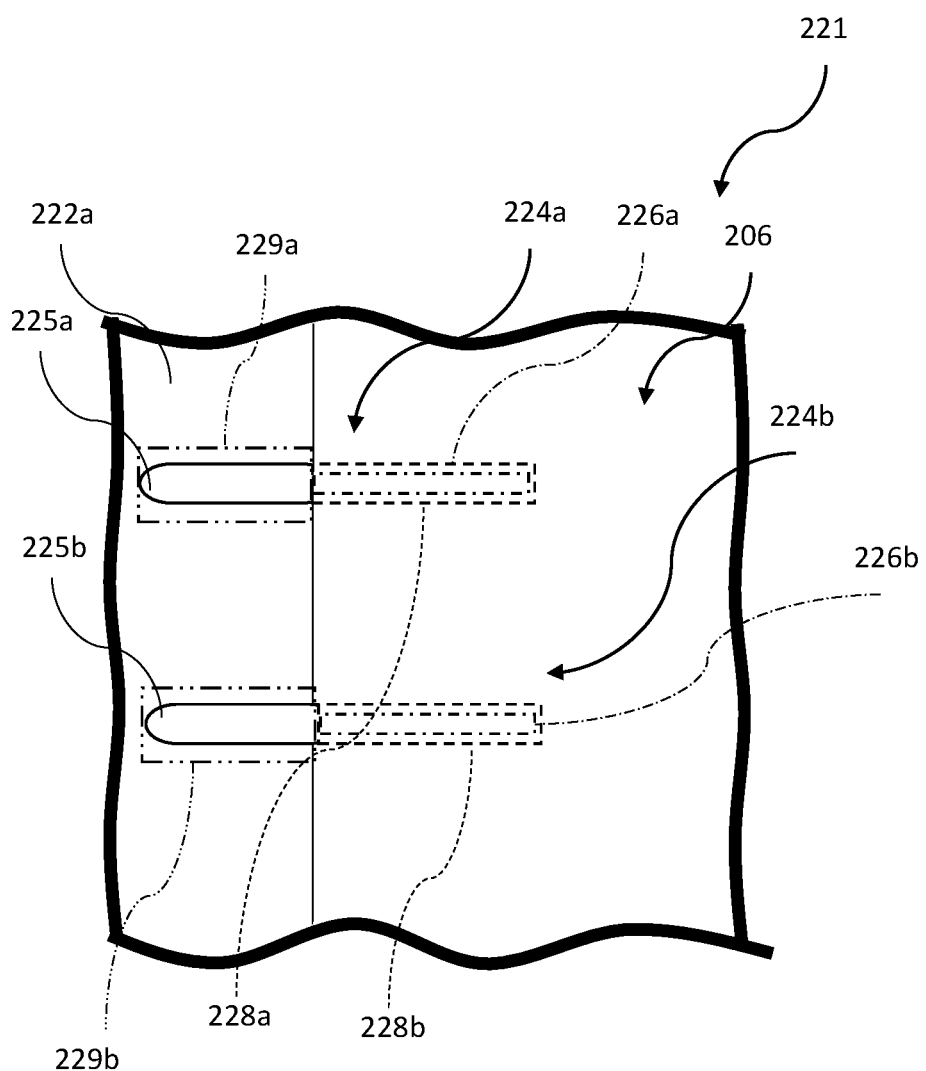
FIG. 7A is a schematic front side view of a retention device from a tailgate device, according to a third embodiment of the present disclosure.

Referring now additionally to FIG. 7A, another embodiment of the first retention device 221 is now described. In this embodiment of the first retention device 221, those elements already discussed above with respect to FIGS. 3-6 are incremented by 100 and most require no further discussion herein. This embodiment differs from the previous embodiment in that this first retention device 221 illustratively includes a plurality of dowels 224a-224b to be received by first and second truck bed recesses 229a-229b of the first and second side portions 222a-222b of the truck bed of the vehicle 201. Each dowel 224a-224b illustratively comprises an elongate member 225a-225b configured to extend outward and away from the second ends 206, 212 of the first and second panels 203, 207 and retract inward, and an elastic member 226a-226b (e.g. coil springs) coupled to the elongate member and to bias the elongate member to extend outward. The second ends 206, 212 of the first and second panels 203 illustratively includes a plurality of panel recesses 228a-228b for carrying the elastic member 226a-226b and receiving the elongate member 225a-225b when retracted therein. Each of the plurality of dowels 224a-224b may comprise a metallic material in some embodiments.

Figure 7B:
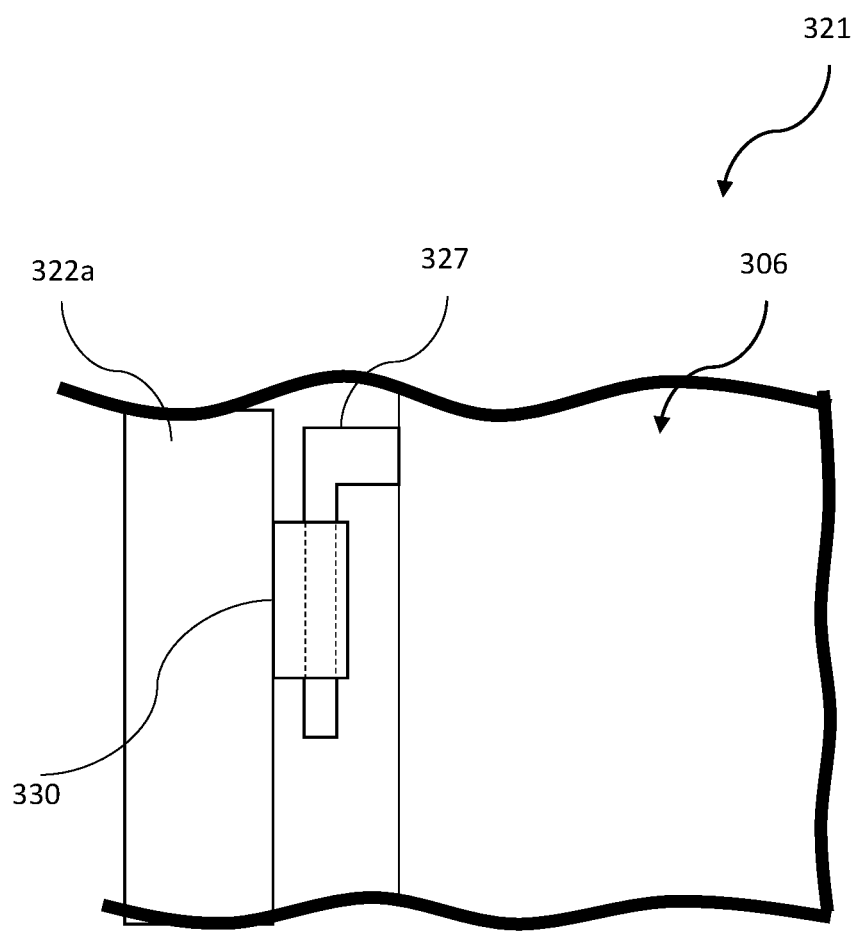
FIG. 7B is a schematic front side view of a retention device from a tailgate device, according to a fourth embodiment of the present disclosure.

Referring now additionally to FIG. 7B, another embodiment of the first retention device 321 is now described. In this embodiment of the first retention device 321, those elements already discussed above with respect to FIGS. 3-6 are incremented by 200 and most require no further discussion herein. This embodiment differs from the previous embodiment in that this first retention device 321 illustratively includes a retention arm 327 extending vertically, and a slot 330 coupled to the first and second side portions 322a-322b of the truck bed of the vehicle 301, the retention arm to be slidingly engaged with the slot when in the extended state.

It should be appreciated that the second retention device 123 would mirror the construction of the first retention device 121 in the embodiments of FIGS. 7A-7B. Also, as will be appreciated by the skilled person, some or all of the features of the different embodiments of the tailgate device 100 disclosed may be combined with one another.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A tailgate device for a vehicle, the tailgate device comprising:
   a first panel defining a plurality of first openings therein and having first and second ends;
   a second panel defining a plurality of second openings therein and having first and second ends;
   a hinge coupled between the first ends of the first and second panels and permitting the first and second panels to switch between an extended state and a folded state;
   a sleeve receiving uppermost portions of the first ends of the first and second panels and aligned with the hinge to lock the first and second panels in the extended state;
   a first retention device coupled to the second end of the first panel and to be coupled to a first side portion of a truck bed of the vehicle; and
   a second retention device coupled to the second end of the second panel and to be coupled to a second side portion of the truck bed of the vehicle.

2. The tailgate device of claim 1 wherein the sleeve comprises first and second arms extending vertically to abut the first ends of the first and second panels, and a medial portion between the first and second arms and on the uppermost portions of the first ends of the first and second panels.

3. The tailgate device of claim 1 wherein each of the first and second retention devices comprises a plurality of dowels to be received by the first and second side portions of the truck bed of the vehicle.

4. The tailgate device of claim 3 wherein each dowel comprises an elongate member configured to extend outward and away from the second ends of the first and second panels and retract inward, and an elastic member coupled to the elongate member and to bias the elongate member to extend outward.

5. The tailgate device of claim 1 wherein each of the first and second retention devices comprises a magnetic device configured to magnetically couple to the first and second side portions of the truck bed of the vehicle.

6. The tailgate device of claim 1 wherein each of the first and second retention devices comprises a retention arm extending vertically, and a slot coupled to the first and second side portions of the truck bed of the vehicle, the retention arm to be slidingly engaged with the slot when in the extended state.

7. The tailgate device of claim 1 wherein each of the plurality of first openings comprises a longitudinal slot; and wherein each of the plurality of second openings comprises a longitudinal slot.

8. The tailgate device of claim 7 wherein each longitudinal slot comprises parallel first and second sides, and curved first and second ends between the first and second sides.

9. The tailgate device of claim 1 wherein each of the first and second panels comprises a polymer plastic material.

10. A tailgate device for a vehicle, the tailgate device comprising:
- a first panel defining a plurality of first openings therein and having first and second ends, each of the plurality of first openings comprising a longitudinal slot;
- a second panel defining a plurality of second openings therein and having first and second ends, each of the plurality of second openings comprising a longitudinal slot;
- a hinge coupled between the first ends of the first and second panels and permitting the first and second panels to switch between an extended state and a folded state;
- a sleeve receiving uppermost portions of the first ends of the first and second panels and aligned with the hinge to lock the first and second panels in the extended state, the sleeve comprising
  - first and second arms extending vertically to abut the first ends of the first and second panels, and
  - a medial portion between the first and second arms and on the uppermost portions of the first ends of the first and second panels;
- a first retention device coupled to the second end of the first panel and to be coupled to a first side portion of a truck bed of the vehicle; and
- a second retention device coupled to the second end of the second panel and to be coupled to a second side portion of the truck bed of the vehicle.

11. The tailgate device of claim 10 wherein each of the first and second retention devices comprises a plurality of dowels to be received by the first and second side portions of the truck bed of the vehicle.

12. The tailgate device of claim 11 wherein each dowel comprises an elongate member configured to extend outward and away from the second ends of the first and second panels and retract inward, and an elastic member coupled to the elongate member and to bias the elongate member to extend outward.

13. The tailgate device of claim 10 wherein each of the first and second retention devices comprises a magnetic device configured to magnetically couple to the first and second side portions of the truck bed of the vehicle.

14. The tailgate device of claim 10 wherein each of the first and second retention devices comprises a retention arm extending vertically, and a slot coupled to the first and second side portions of the truck bed of the vehicle, the retention arm to be slidingly engaged with the slot when in the extended state.

15. The tailgate device of claim 10 wherein each longitudinal slot comprises parallel first and second sides, and curved first and second ends between the first and second sides.

16. The tailgate device of claim 10 wherein each of the first and second panels comprises a polymer plastic material.

17. A method for making a tailgate device for a vehicle, the method comprising:
- forming a first panel defining a plurality of first openings therein and having first and second ends;
- forming a second panel defining a plurality of second openings therein and having first and second ends;
- coupling a hinge between the first ends of the first and second panels and permitting the first and second panels to switch between an extended state and a folded state;
- providing a sleeve to receive uppermost portions of the first ends of the first and second panels and to be aligned with the hinge to lock the first and second panels in the extended state;
- coupling a first retention device to the second end of the first panel and to be coupled to a first side portion of a truck bed of the vehicle; and
- coupling a second retention device to the second end of the second panel and to be coupled to a second side portion of the truck bed of the vehicle.

18. The method of claim 17 wherein the sleeve comprises first and second arms extending vertically to abut the first ends of the first and second panels, and a medial portion between the first and second arms and on the uppermost portions of the first ends of the first and second panels.

19. The method of claim 17 wherein each of the first and second retention devices comprises a plurality of dowels to be received by the first and second side portions of the truck bed of the vehicle; wherein each dowel comprises an elongate member configured to extend outward and away from the second ends of the first and second panels and retract inward, and an elastic member coupled to the elongate member and to bias the elongate member to extend outward.

20. The method of claim 17 wherein each of the first and second retention devices comprises a magnetic device configured to magnetically couple to the first and second side portions of the truck bed of the vehicle.

* * * * *